3,556,823
SINTERED POLYCRYSTALLINE MAGNESIA BODIES AND METHOD FOR PRODUCTION THEREOF

Shiro Sano, Shuzo Kato, Eiichi Ishii, and Takeo Iga, Nagoya, Japan, assignors to Agency of Industrial Science and Technology, Tokyo, Japan, a corporation of Japan
No Drawing. Filed Oct. 25, 1967, Ser. No. 677,881
Claims priority, application Japan, Oct. 26, 1966, 41/70,118
Int. Cl. C04b 35/04
U.S. Cl. 106—58                                3 Claims

ABSTRACT OF THE DISCLOSURE

Gallium oxide is added to magnesia containing calcium oxide to form a calcium gallate, and the mixture is shaped and sintered.

---

This invention relates to sintered polycrystalline magnesia bodies and a method for the production thereof.

Magnesia has superior characteristics in that it is low in dielectric loss at high frequencies, is high in insulation resistance even at high temperatures, is relatively high in thermal conductivity, has a high coefficient of thermal expansion, and is highly resistant to alkali. Accordingly, attempts are presently made to utilize magnesia not only as an electric insulating material, but also for mercury lamps, sodium-vapor lamps or infrared radiator-protecting tubes, but, for these purposes, magnesia must be sintered. However, magnesia has a melting point of 2800° C. and is, therefore, difficult to sinter; particularly, in order to obtain a sintered magnesia body which is dense and translucent, magnesia must be sintered in high vacuo at above about 1700° C. for several hours, or must be sintered at a temperature near the melting point thereof.

To facilitate the sintering of magnesia, a method using additives such as clay, zinc, boron, etc. is known, but it is defective in that some of the characteristics of magnesia are impaired. Also, there is a method using a hot press, but, because its steps are complicated, this method is unsuitable for mass production.

An object of this invention is to provide a method of sintering magnesia without impairing its characteristics.

Another object of this invention is to provide a sintered polycrystalline magnesia body which is superior in resistance to hydration.

Still another object of this invention is to provide a sintered polycrystalline magnesia body which is superior in translucency.

Other objects and characteristic features of this invention will become apparent from the complete description and specific examples as will be given hereunder.

As mentioned above, magnesia has a melting point of 2800° C. and is, therefore, difficult to sinter. So far, it has been impossible to carry out production on a commercial basis of sintered polycrystalline magnesia bodies which are superior in translucency.

In view of such actual circumstances, the present inventors conducted research and, in consequence, found it possible, by sintering magnesia with gallium oxide added at a temperature of 1300–1750° C., to obtain sintered polycrystalline magnesia bodies easily without impairing the characteristics inherent in magnesia, and, also, by changing the amount of gallium oxide addition between 0.05–15 weight percent, the sintering temperature, the sintering time, the atmosphere, etc., to obtain sintered polycrystalline magnesia bodies which are superior in translucency, in resistance to hydration, in acid resistance, etc., respectively, in accordance with the intended use.

As stated above, the added amount of gallium oxide is variable depending upon the intended use of the sintered magnesia bodies. That is to say, to obtain sintered magnesia bodies which are high in resistance to hydration, the addition of more than 3.5% by weight of gallium oxide is effective, but, if the added amount exceeds 15% by weight, the magnesia adheres to the setter of a furnace and produces deformation by vitrification at the time of sintering. Also, to obtain sintered magnesia bodies which are superior in translucency, the addition of gallium oxide in an amount of 0.5–2.0% by weight is most effective.

In the case of sintering magnesia, if gallium oxide alone is added, it acts to form a gallium-magnesium spinel, making the sintering effective, but, if gallium oxide is added in combination with less than 15 weight percent calcium oxide, the two act to form calcium gallates, exhibiting a synergistic effect in sintering. However, no effect is observed if gallium oxide is added in an amount less than 0.05% by weight.

The impurity content in the magnesia to be used is not specifically restricted. Usually, magnesia contains iron, calcium, aluminium, zinc, barium, silica, etc., of which, in particular, calcium or aluminium, even if contained in an amount of about 10% by weight, gives good results by the synergistic effect with the gallium oxide. For example, in a test in which sintering was effected in nitrogen at 1300° C. by adding 0.5% by weight of gallium oxide to magnesia containing 9.7% by weight of calcium oxide as an impurity, it was possible to produce a sintered polycrystalline magnesia body which was superior in translucency.

Also, the atmosphere in sintering is not specifically restricted, but, if sintering is carried out in hydrogen or in vacuo, the developing of color by the iron oxide contained in magnesia can be suppressed, with the result that a sintered magnesia body which is high in whiteness and superior in translucency can be obtained. In order to prevent decrease in translucency due to the coloring impurities such as iron, manganese, etc., contained in magnesia, it is desirable to carry out the sintering in hydrogen, nitrogen or argon or in high vacuo. However, it is also possible, by carrying out the sintering in air, to change the yellowish brown color due to iron into pale yellow.

In the case where the added amounts of gallium oxide and calcium oxide are large, yet where translucency is not desired, it suffices to carry out the sintering at 1300° C., but, on the other hand, in the case where the addition amounts of the two are small, yet where translucency is desired, the sintering must be carried out at 1750° C. Also, in the case where translucency is not desired, if sintering is carried out at a temperature about 100° C. lower than the temperature in the case where translucency is desired, a sintered magnesia body which is superior in resistance to hydration to the extent that the degree of water absorption is 0.00% can be obtained.

Hereinabove, the case of using gallium oxide has been explained, but, in place thereof, gallium nitrate, gallium hydrate and gallium chloride may likewise be used since these compounds decompose into gallium oxide when sintered.

This invention is further illustrated by the following specific examples, but these examples are not intended to limit the scope of this invention.

EXAMPLE 1

To a light burned magnesia (purity, more than 99%; CaO 0.35%; $Al_2O_3$ 0.14%; $Fe_2O_3$ 0.025%), 2 weight percent gallium oxide ($Ga_2O_3$ 99.99%) and 2 weight percent calcium oxide were added. The mixture was then shaped under a pressure of 750 kg./cm.$^2$ and thereafter sintered in vacuo ($10^{-3}$—$10^{-4}$ mm. Hg) at 1500° C. for one hour. The resulting sintered polycrystalline magnesia body has a density which was 96% of the theoretical density and a water absorption of 0.00%, and, when 0.5 mm. thick, exhibited a in line transmission of about 20% within the range of visible light. The said sintered magnesia body, when treated further in an autoclave under 10 atmospheric pressures for one hour, exhibited a hydration rate of 0.0%, a dielectric loss of less than $1 \times 10^{-4}$ and an insulation resistance of more than $10^{13}$ Ωcm. (at room temperature).

EXAMPLE 2

To a basic magnesium carbonate (purity, more than 99%; CaO less than 0.30%; $Al_2O_3$ less than 0.02%; $Fe_2O_3$ less than 0.003%), 2 weight percent gallium oxide ($Ga_2O_3$ 95%) and 2 weight percent calcium carbonate were added. The mixture was then calcined at 800–1100° C. for one hour and thereafter sintered in nitrogen at 1700° C. for one hour to obtain a sintered polycrystalline magnesia body. As a result of measurement, this magnesia body was found to have almost the same characteristics as in Example 1.

EXAMPLE 3

In a gallium oxide (purity 99.9%)-calcium oxide (purity 99%) mixing ratio of 1:0.9 (weight percent), a mixture containing 0.05–15 weight percent gallium oxide was added to magnesia, and the resulting mixture was sintered in air at 1500° C. for one hour. When the addition amount of gallium oxide was within the range of 3.5–15% by weight, the sintered polycrystalline magnesia body obtained was very superior in that it had a hydration rate of less than 0.2%, and showed an average coefficient of thermal expansion of $12-14 \times 10^{-6}$ (at from room temperature to 855° C.) which was close to the value inherent in magnesia.

Also, in the same mixing ratio, the amounts of calcium oxide with about 1–3 weight percent and aluminium oxide with about less than 0.5 weight percent were added and the sintering was carried out in vacuo ($10^{-3}$—$10^{-4}$ mm. Hg) at 1500° C. for one hour, in which case the resulting sintered polycrystalline magnesia body was most superior in translucency.

EXAMPLE 4

In a gallium oxide-calcium oxide mixing ratio of 1:0.9 (weight percent), a mixture containing 0.5–10 weight percent gallium oxide was added to magnesia, and the resulting mixture was sintered in air at 1500° C. for one hour. When the addition amount of gallium oxide was within the range of 2.5–5% by weight, the sintered polycrystalline magnesia body obtained was superior in that it had an acid resistance of 2 mg./cm.$^2$. This value, however, somewhat lowered when the amount of gallium oxide exceeded 5 weight percent.

Also, for a possession of hydration resistance and an increase of acid resistance, as the addition amount of calcium oxide is rather better than less than 15 weight percent, in the same mixing ratio, 5–15 weight percent as the amount of gallium oxide was added together with 0.1–20 weight percent aluminium oxide to magnesia, and the mixture was sintered in the same way as above, with the result that it was possible to obtain a sintered polycrystalline magnesia body having an acid resistance of less than 2 mg./cm.$^2$.

EXAMPLE 5

In such mixing ratios of gallium oxide with calcium oxide as 1:2.7, 1:2.0, 1:1.5, 1:1.0 and 1:0.9 in weight, with the added amount of calcium oxide of less than 15 weight percent to the magnesia, the resulting sintered polycrystalline magnesia body showed a Te value of 1290–1330° C., and was far superior to those obtained without adding gallium oxide and calcium oxide.

EXAMPLE 6

To a basic magnesium carbonate (MgO 96.93%, $Al_2O_3$ 0.16%, $Fe_2O_3$ 0.18%, CaO 1.74%, $Na_2O$ 0.15%) calcined at 1000° C. for one hour, 1.5 weight percent gallium oxide and, as shaping agents, 2 weight percent methyl cellulose and 3 weight percent carbowax were added, and the mixture was shaped into a disc at 1 t./cm. by using a rubber press. The disc was then calcined at 1000° C. and thereafter sintered in vacuo ($10^{-4}$ mm. Hg) at 1700° C. for 30 minutes. The resulting sintered polycrystalline magnesia body, when 0.3 mm. thick, showed an in line transmission of about 60% within the range of visible ray. Also, when said disc was sintered in nitrogen, and in argon, at 1500° C. for one hour, the resulting sintered polycrystalline magnesia bodies showed $a$ in line transmission of about 25% and about 20%, respectively.

The sintered polycrystalline magnesia bodies mentioned herein all showed no change whatsoever even when left alone in a 35% potassium hydroxide solution at room temperature for 75 days.

EXAMPLE 7

To a dead burned magnesia (MgO 97.2%, CaO 1.6% $Al_2O_3$ 0.8%, $Fe_2O_3$ 0.1%), 5 weight percent gallium nitrate was added, and the mixture was sintered in air at 1600° C. for one hour in form of itself or block to obtain a sintered polycrystalline magnesia body. It was then roughly ground for use as a sheath-wire insulation packing material, which, when compared with the sintered body obtained without adding gallium nitrate, was found far superior in insulation resistance.

In the examples mentioned above, the acid resistance was measured by dipping a cylindrical sample of 10 mm. in diameter and 10 mm. in length in a hot bath (90°±1° C.) for 5 hours, said hot bath consisting of 100 cc. mixed solution of equal amounts of hydrochloric acid, nitric acid and sulfuric acid, each being of 10% concentration.

Acid resistance (reduced weight per unit area) mg./cm.$^2$ $$= \frac{\text{Weight of sample} - \text{Weight of sample after treatment}}{\text{Initial total surface area of sample}}$$

While the invention has been described in detail with reference to certain specific embodiments thereof, it will be understood that variations and modifications may be effected without departing from the spirit and scope of the invention as described hereinabove and as defined in the appended claims.

What is claimed is:

1. A method of producing a sintered polycrystalline magnesia body, comprising the steps of adding a gallium compound to magnesia containing less than 15 weight percent of calcium oxide, the gallium compound being selected from the group consisting of gallium oxide, gallium nitrate, gallium hydrate and gallium chloride, said compound forming a calcium gallate with the calcium oxide in the magnesia, the amount of the calcium oxide and gallium compound in the magnesia being sufficient to form said calcium gallate, and the amount of the gallium compound being between 0.05 and 15 weight percent, as gallium oxide, shaping the mixture, and sintering the shaped mixture at a temperature of 1300° to 1750° C.

2. The method of claim 1, wherein a sufficient amount of calcium oxide is added to the magnesia to obtain said amount of calcium oxide therein.

3. A sintered polycrystalline ceramic magnesia body consisting essentially of magnesia and a calcium gallate, the calcium gallate having been formed by calcium oxide contained in the magnesia and a gallium compound selected from the group consisting of gallium oxide, gallium nitrate, gallium hydrate and gallium chloride, the amount of the calcium gallate corresponding to 0.005 to 15 weight percent of the gallium compound present before sintering.

References Cited

UNITED STATES PATENTS 3,236,595   2/1966   Carnall et al. _____ 106—58

JAMES E. POER, Primary Examiner

U.S. Cl. X.R.

106—39